United States Patent
Chambonneau et al.

(10) Patent No.: US 9,032,863 B2
(45) Date of Patent: May 19, 2015

(54) CAM FOLLOWER ROLLER DEVICE, NOTABLY FOR A FUEL INJECTION PUMP

(75) Inventors: Charles Chambonneau, Joue-les-tours (FR); Torbjorn Hedman, Saint Cyr sur Loire (FR); Gwenael Hingouet, Saint Cyr sur Loire (FR)

(73) Assignee: AKTIEBOLAGET SKF, Gothenburg (SE)

( * ) Notice: Subject to any disclaimer, the term of this patent is extended or adjusted under 35 U.S.C. 154(b) by 708 days.

(21) Appl. No.: 13/375,077

(22) PCT Filed: May 31, 2010

(86) PCT No.: PCT/EP2010/057550
§ 371 (c)(1),
(2), (4) Date: Feb. 6, 2012

(87) PCT Pub. No.: WO2010/139663
PCT Pub. Date: Dec. 9, 2010

(65) Prior Publication Data
US 2012/0125277 A1    May 24, 2012

(30) Foreign Application Priority Data
Jun. 5, 2009 (FR) ...................... 09 53746

(51) Int. Cl.
*F01L 1/14* (2006.01)
*F04B 1/04* (2006.01)
*F16H 53/06* (2006.01)

(52) U.S. Cl.
CPC .............. *F04B 1/0417* (2013.01); *F16H 53/06* (2013.01)

(58) Field of Classification Search
CPC ........ F04B 1/0417; F04B 9/042; F16H 53/06; F16J 1/10
USPC .......................................... 91/491; 92/72, 129
See application file for complete search history.

(56) References Cited

U.S. PATENT DOCUMENTS

| 7,497,157 B2* | 3/2009 | Aoki et al. ....................... 92/129 |
| 7,762,176 B2* | 7/2010 | Vu ..................................... 92/72 |
| 7,793,583 B2* | 9/2010 | Radinger et al. ................ 92/129 |
| 2005/0000314 A1* | 1/2005 | Mandal et al. ................... 74/569 |
| 2006/0042459 A1* | 3/2006 | Pecorari et al. ................. 91/491 |

FOREIGN PATENT DOCUMENTS

| DE | 3724579 A1 | 3/1988 | |
| DE | 10345089 A1 | 4/2005 | |
| DE | 102006045933 A1 | 4/2008 | |
| DE | 102006057246 A1 * | 6/2008 | ............ F04B 1/0439 |
| WO | WO2005031151 A1 | 4/2005 | |

* cited by examiner

*Primary Examiner* — Dwayne J White
*Assistant Examiner* — Matthew Wiblin
(74) *Attorney, Agent, or Firm* — Bryan Peckjian; SKF USA Inc. Patent Dept.

(57) ABSTRACT

Cam follower roller device, notably for an internal combustion engine fuel injection pump, comprising a tappet (12) and a roller (14) mounted to rotate on the tappet and intended to press against a cam. The tappet (12) comprises a roller support body (16), a shaft (26) for mounting the roller on the said body, and a guide sleeve (18) attached to the support body and at least partially surrounding the said body. The ends of the shaft are fixed in through-holes in the support body.

12 Claims, 2 Drawing Sheets

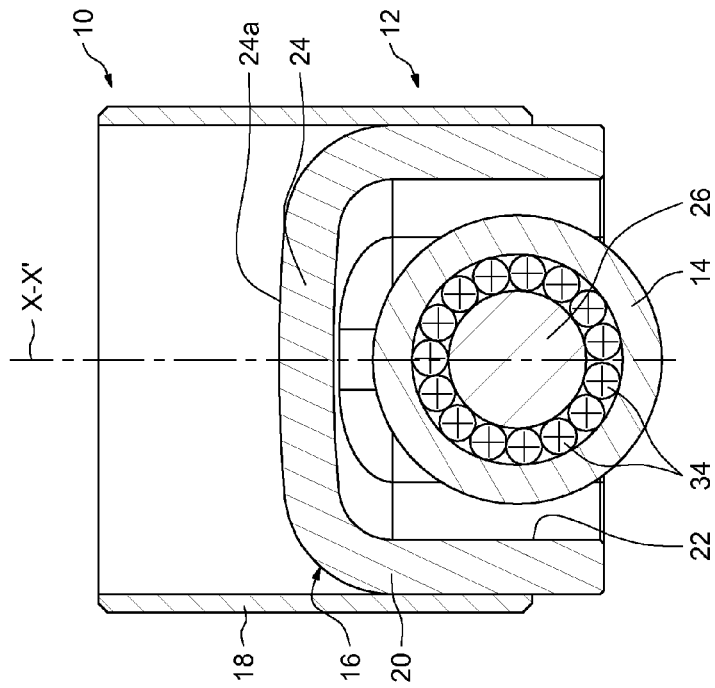
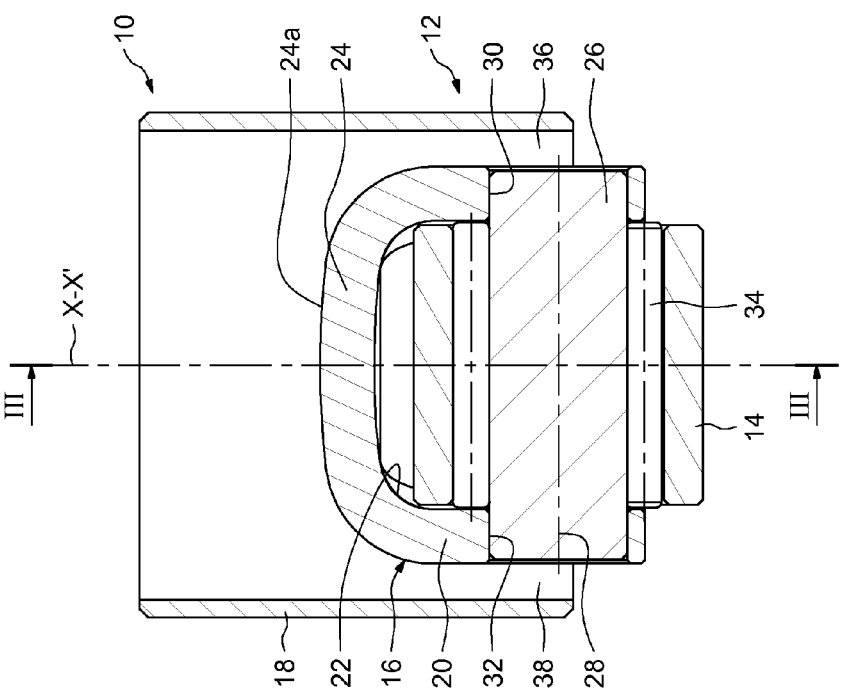

CAM FOLLOWER ROLLER DEVICE, NOTABLY FOR A FUEL INJECTION PUMP

CROSS-REFERENCE

This application is the US national stage of International Application No. PCT/EP2010/057550 filed on May 31, 2010, which claims priority to French Application No. 0953746 filed Jun. 5, 2009.

FIELD OF THE INVENTION

The present invention relates to the field of cam follower roller devices used in automotive or industrial applications.

BACKGROUND OF THE INVENTION

One advantageous application of the invention is the use of the cam follower roller device in a fuel injection pump intended for an internal combustion engine, notably of a motor vehicle.

As is known per se, a device such as this comprises a tappet and a roller mounted to rotate on the tappet and designed to collaborate with a cam synchronized with the internal combustion engine camshaft so that the rotation of the camshaft leads to a periodic displacement of a piston of the pump that rests against the said tappet, to allow fuel to be delivered.

Another advantageous application of the invention is the use of the device in a rocker system designed for controlling the valves of an internal combustion piston engine.

In this application, the roller of the device is designed to collaborate, by rolling on it, with a cam of the engine camshaft so that rotation of the camshaft causes a periodic pivoting of a rocker element, to open and close the valves of the engine.

Conventionally, the tappet of such devices is made of a relatively solid single piece, for example by cold forging. The tappet therefore has relatively high inertia, and this may lead to energy losses during operation.

Furthermore, the roller of the device is generally mounted to rotate on the tappet via an attached spindle.

Now, this spindle is conventionally mounted on the tappet by upsetting or crimping, and this can cause the said tappet to become deformed.

When this happens, it is possible that the tappet manufacturing tolerances are no longer met, and this proves problematical in obtaining correct sliding of the tappet inside the guide bore formed in the associated housing.

It is an object of the present invention to address these disadvantages.

More specifically, it is an object of the present invention to provide a cam follower roller device that has relatively low inertia, that is reliable, that is economical, and that is easy to manufacture and to assemble.

SUMMARY OF THE INVENTION

In one embodiment, the cam follower roller device, notably for an internal combustion engine fuel injection pump, comprises a tappet and a roller mounted to rotate on the tappet and intended to press against a cam. The tappet comprises a roller support body, a shaft for mounting the roller on the said body, and a guide sleeve attached to the support body and at least partially surrounding the said body. The ends of the shaft are fixed in through-holes in the support body.

This then yields a cam follower roller device comprising a tappet made as two distinct or separate parts which are fixed together.

In other words, the tappet comprises a roller support body, a guide sleeve distinct from the support body, and means of fixing the said body and sleeve to one another. Creating the tappet by assembling separate parts allows a significant reduction in the overall weight of the tappet. This is because the support body and the sleeve can each be made with a small thickness.

Furthermore, any deformation that may befall the support body when the roller is being mounted does not alter the dimensional characteristics of the exterior surface of the guide sleeve which is designed to slide inside the bore formed in the housing of the injection pump.

The shaft is fixed directly to the support body and only to the said body so as to avoid any variation in the dimensional characteristics of the exterior surface of the guide sleeve.

Furthermore, the exterior surface of the guide sleeve becomes easier to grind by comparison with a part obtained by cold forging, notably when the sleeve is obtained through a machining operation that involves the removal of chips (turning and parting off).

In one embodiment, the ends of the shaft remain some distance from the bore of the guide sleeve. This then avoids any contact between the support shaft and the sleeve.

Advantageously, the support body has a contact surface for contact with a piston, notably the piston of the fuel injection pump, the said contact surface being convex.

Providing a shape that is convex allows the support body to work under compression and reduces the area of contact between the support body and the piston.

In one embodiment the guide sleeve leaves spaces between those portions of a peripheral wall that comprise the through-holes and the bore of the said sleeve, so as to allow a lubricant to pass towards the region of contact between the roller and the cam.

This arrangement is particularly advantageous when the device is mounted in the housing of the fuel injection pump, because the sleeve is generally placed in a bath of lubricant, for example oil. The passage or passages allow the lubricant to flow to the region of contact between the exterior surface of the roller and the cam.

For preference, the support body is produced from a sheet metal blank by cutting, pressing and bending. This then yields a lower-cost part.

The guide sleeve may be fixed to the support body by welding or brazing or crimping, or bonding or clip fastening or push-fitting, or riveting, etc.

In one embodiment, the ends of the shaft may be push-fitted into the through-holes in the support body.

In one embodiment, the guide sleeve is of tubular overall shape. The support body may be yoke-shaped overall.

BRIEF DESCRIPTION OF THE DRAWINGS

The present invention will be better understood from studying the detailed description of one embodiment taken by way of non-limiting example and illustrated by the attached drawings, in which:

FIG. 2 is a view in section of the device of FIG. 1, and FIG. 3 is a view in section on III-III of FIG. 2.

DETAILED DESCRIPTION OF THE PREFERRED EMBODIMENTS

Figure 1:
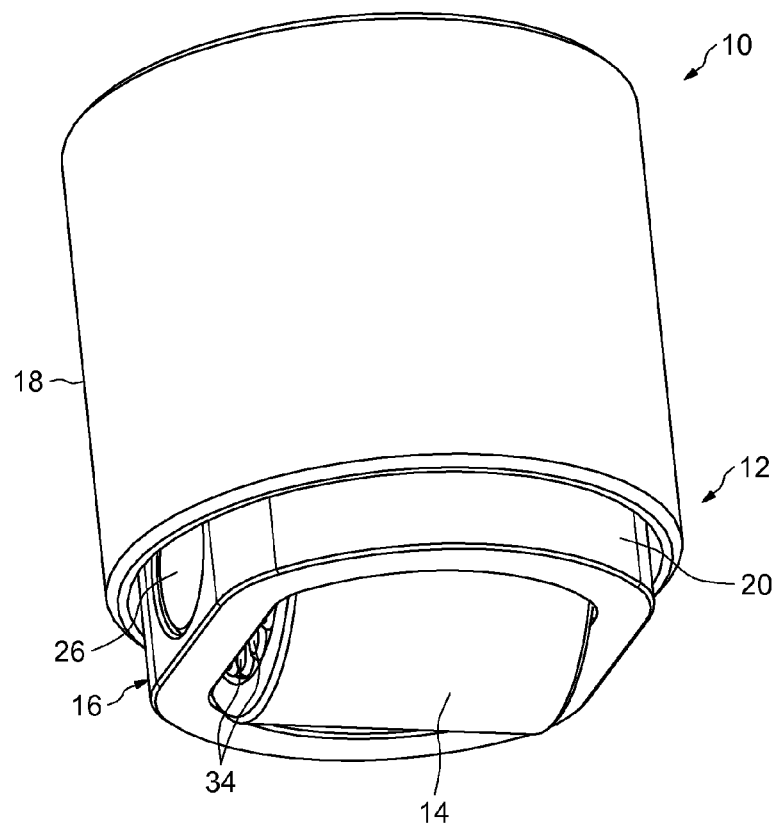
FIG. 1 is a perspective view of a cam follower roller device according to the invention.

FIGS. 1 to 3 depict a cam follower roller device denoted by the overall numerical reference 10 and which may, for example, be used in a fuel injection pump intended for an internal combustion engine. The device 10 is depicted in these figures in a position assumed to be vertical.

Of course, the device 10 may be used in other applications, for example in a rocker system designed for controlling the valves of an internal combustion piston engine.

The device 10 mainly comprises a tappet 12 and a roller 14 mounted to rotate on the tappet and intended to press against a cam synchronized with the internal combustion engine camshaft or directly against a cam of the said shaft.

The tappet 12 comprises a roller support body 16 and a sleeve 18 fixed to the said body and at least partially surrounding it. The support body 16 is partially housed inside the sleeve 18.

The support body 16, of axis X-X', takes the form of a parallelepipedal yoke and may advantageously be obtained at low cost from a thin sheet metal blank by cutting, pressing and bending. The support body 16 has a peripheral wall 20 delimiting a housing 22 inside which the roller 14 is partially housed. In cross section, the peripheral wall 20 is of rectangular overall shape. It is extended at an upper end by a radial wall 24 comprising an upper surface 24a of convex shape directed axially upward.

For an application of the device 10 in a fuel injection pump intended for an internal combustion engine, a piston of the pump presses against the contact surface 24a. When the device 10 is used in a rocker system for controlling the valves of an internal combustion engine, a push rod collaborating with a rocker element presses against the contact surface 24a.

A shaft 26 of geometric axis 28 is used to mount the roller 14 at the lower end of the support body 16. The geometric axis 28 is perpendicular to the axis X-X'. The ends of the shaft 26 are fixed, for example by push-fitting, in bores or through-holes 30, 32 formed in the peripheral wall 20 facing one another. The shaft 26 could of course be fixed to the support body using any other appropriate means. In the exemplary embodiment illustrated, the through-holes 30, 32 are of cylindrical overall shape. Alternatively, it might be possible to provide through-holes or bores that are U-shaped overall, opening onto the lower end of the peripheral wall 20 to make the shaft 26 easier to fit.

The axial ends of the shaft 26, when considering the axis 28, remain distant from or axially setback from the bore of the sleeve 18 so as to prevent contact between these two elements. In the exemplary embodiment illustrated, the axial ends of the shaft 26 are axially setback from the exterior surface of the peripheral wall 20 of the support body 16.

In order to limit frictional torque and wear between the shaft 26 and the roller 14, a plurality of cylindrical needles 34 are arranged against one another between the exterior surface of the said shaft and the bore of the roller. Alternatively, it could also be conceivable to have the bore of the roller 14 coming into contact with the exterior surface of the shaft 26.

The sleeve 18, of axis X-X' but of tubular overall shape may be made of steel. It partially radially surrounds the support body 16, the shaft 26 and the roller 14. More specifically, the upper end of the sleeve 18 is axially offset upwards with respect to the contact surface 24a of the support body 16, the lower end being situated substantially level with the geometric axis 28 of the shaft 26.

The sleeve 18 is fixed against the peripheral wall 20 of the support body 16, for example by push-fitting. Alternatively, means of fixing the sleeve 18 and the support body 16 together may comprise welds or brazing. Alternatively, it is even possible for these two elements to be fixed together by crimping, bonding, riveting, clip-fastening or any other appropriate means.

Once the sleeve 18 has been fixed to the support body 16, bearing in mind the rectangular cross section of the said body, the sleeve leaves axial spaces 36, 38 between the peripheral wall 20 and the bore of the sleeve. The spaces 36, 38 are situated between the portions of the peripheral wall 20 that support the ends of the shaft 26 and the bore of the sleeve 18. When the device 10 is used in a fuel injection pump, these spaces 36, 38 allow lubricant from the pump to pass towards the region of contact between the roller 14 and the cam synchronized with the camshaft.

The invention therefore provides a cam follower roller device 10 comprising a tappet 12 provided with two separate parts, namely the support body 16 and the sleeve 18, each of which can be manufactured at low cost and then assembled.

The support body 16 may advantageously be obtained from a thin sheet metal blank by cutting, pressing and bending, with no subsequent machining operation in so far as this element has the sole function of supporting the roller 14. The sleeve 18 can also be obtained economically by machining with the removal of chips (turning and parting off) from tubes, bar stock, forged and/or rolled preforms. It is then possible to plan to grind the exterior surface of the sleeve 18, given that this surface is designed to slide inside a bore of an associated housing, for example the housing of the injection pump when the device 10 is being used for this application.

Furthermore, because the support body 16 and the guide sleeve 18 are distinct parts, it is possible for the sleeve to be given a relatively small thickness so as to obtain a tappet of low inertia.

The invention claimed is:

1. A cam follower roller device for an internal combustion engine fuel injection pump, the cam follower comprising:
    a tappet and a roller mounted to rotate on the tappet and intended to press against a cam, and wherein the tappet comprises:
    a roller support body,
    a shaft for mounting the roller on the roller support body, and
    a guide sleeve attached to the roller support body and at least partially surrounding the roller support body, and wherein
    axial ends of the shaft are fixed in through-holes in the roller support body such that the shaft does not engage the guide sleeve.

2. The cam follower roller device according to claim 1, wherein the axial ends of the shaft remain some distance from an inner surface of the guide sleeve.

3. The cam follower roller device according to claim 1, wherein the roller support body has a contact surface for contact with an element external to the device, and wherein the contact surface is convex.

4. The cam follower roller device according to claim 1, wherein the guide sleeve leaves axial spaces between those portions of a peripheral wall of the roller support body that comprise the through-holes and the bore of the said sleeve thereby providing axial space between the axial ends of the shaft and the guide sleeve, so as to allow a lubricant to pass towards the region of contact between the roller and the cam.

5. The cam follower roller device according to claim 1, wherein the roller support body is produced from a sheet metal blank by at least one of a cutting, pressing and bending operation.

6. The cam follower roller device according to claim 1, wherein the guide sleeve is fixed to the roller support body by at least one of a welding and brazing and crimping and bonding and clip fastening and push-fitting operation.

7. The cam follower roller device according to claim 1, wherein the axial ends of the shaft are press fitted into the through-holes in the roller support body.

8. The cam follower roller device according to claim 1, wherein the guide sleeve is of tubular shape.

9. The cam follower roller device according to claim 1, wherein the roller support body is yoke-shaped.

10. The cam follower roller device according to claim 1 wherein, the guide sleeve at least partially surrounds the axial ends of the shaft.

11. A cam follower roller device for an internal combustion engine fuel injection pump, the cam follower comprising:
- a tappet and a roller mounted to rotate on the tappet and intended to press against a cam, and wherein the tappet comprises:
- a roller support body,
- a shaft for mounting the roller on the roller support body, and
- a guide sleeve configured as a cylinder and attached to the roller support body and at least partially surrounding the roller support body and at least partially enclosing axial ends of the shaft such that axial space is disposed between the axial ends of the shaft and the guide sleeve, and wherein
- the axial ends of the shaft are fixed in through-holes in the roller support body such that the shaft does not engage the guide sleeve.

12. A cam follower roller device for an internal combustion engine fuel injection pump, the cam follower comprising:
- a tappet and a roller mounted to rotate on the tappet and intended to press against a cam, and wherein the tappet comprises:
- a roller support body,
- a shaft for mounting the roller on the roller support body, and
- a guide sleeve configured as a cylinder and free of bores therethrough, the guide sleeve attached to the roller support body and at least partially surrounding the roller support body and at least partially enclosing axial ends of the shaft such that axial space is disposed between the axial ends of the shaft and the guide sleeve, and wherein
- the axial ends of the shaft are fixed in through-holes in the roller support body such that the shaft does not engage the guide sleeve.

* * * * *